(No Model.) 2 Sheets—Sheet 1.
J. TORDOFF.
MANUFACTURE OF STEAM BOILER MAN HOLES AND ANALOGOUS DEVICES.
No. 316,312. Patented Apr. 21, 1885.
Fig. 1.
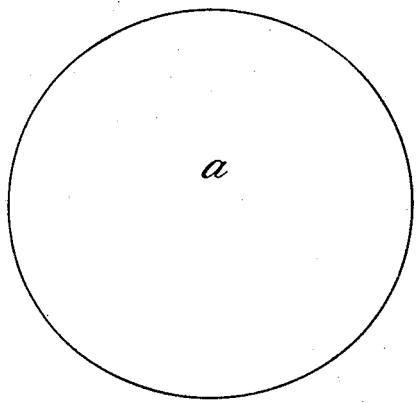
Fig. 2.
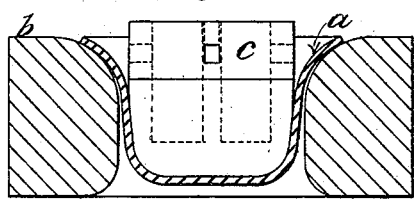
Fig. 3.
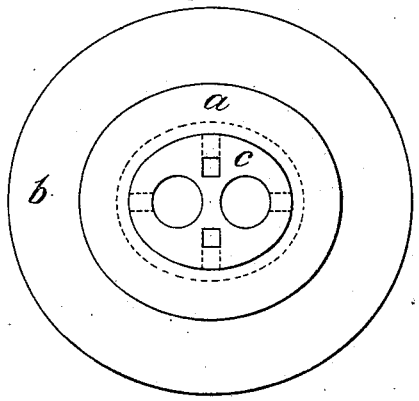
Fig. 4.
Fig. 5.
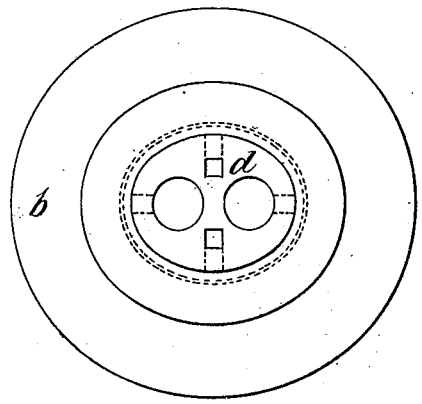
Fig. 6.
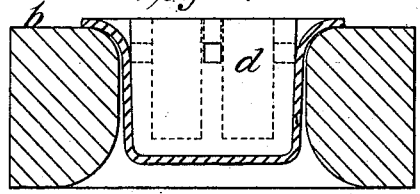
Fig. 7.
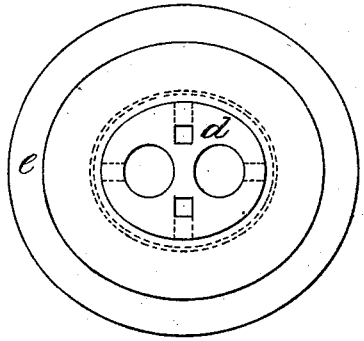
Fig. 8.
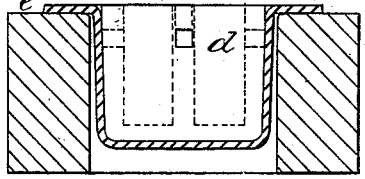
Witnesses:
J. E. Craven. Fell. Inst. P. Agents
24 Victoria Chambers. Leeds
William Sadler
North Street Leeds
Inventor.
Joseph Tordoff (No Model.) 2 Sheets—Sheet 2.

J. TORDOFF.
MANUFACTURE OF STEAM BOILER MAN HOLES AND ANALOGOUS DEVICES.

No. 316,312. Patented Apr. 21, 1885.

Witnesses:
J. E. Craven—Fell. Inst. P. agent
24 Victoria Chambers. Leeds
William Sadler
North Street Leeds Inventor.
Joseph Tordoff

UNITED STATES PATENT OFFICE.

JOSEPH TORDOFF, OF LEEDS, COUNTY OF YORK, ENGLAND.

MANUFACTURE OF STEAM-BOILER MAN-HOLES AND ANALOGOUS DEVICES.

SPECIFICATION forming part of Letters Patent No. 316,312, dated April 21, 1885.

Application filed December 17, 1883. (No model.) Patented in England October 2, 1883, No. 4,695.

*To all whom it may concern:*

Be it known that I, JOSEPH TORDOFF, a subject of the Queen of Great Britain and Ireland, residing at Leeds, in the county of York, Kingdom of Great Britain and Ireland, have invented new and useful improvements in the manufacture of flanged metallic devices of annular form, such as steam-boiler man-holes and the like, of which the following is a specification.

My invention of improvements in the manufacture of flanged metallic devices of annular form, such as steam-boiler man-holes and the like, relates to the formation not only of the devices known as "man-holes," but also of other similar devices, such as "unions" or connecting parts of boilers and their separate steam-chambers, mountings for the reception of safety, stop, or other valves, covers for openings in boilers and other vessels, connecting-pipes between series of tanks or cisterns, and other similar structures of annular form with one or more flanges, as explained below. Heretofore such articles have usually been made either of cast-iron or by bending to form and welding a ductile metallic material, such as wrought-iron or steel. When made by casting, the articles in question cannot in all cases be relied upon to withstand the pressures to which they may be subjected, and, furthermore, they are liable to fracture when being attached to a boiler or other body by riveting. On the other hand, when made by bending to form and welding, they are very costly, owing to the skilled labor required to produce them.

Now, in order to reduce the cost of manufacture, while at the same time producing a superior article according to my invention, a plate of metal of appropriate quality, size, and form for the production of the article required, as hereinafter explained, is heated, and then while in the heated condition is placed upon a female die, the interior configuration of which corresponds with the external shape required to be given to the body or main portion of the article, then by pressure or percussion applied through the medium of a punch or male die so much of the metallic plate is forced into said female die as is needful to form the body and one flange, together with a surplus portion, which is afterward removed, leaving so much of the metallic plate on the entering side of said female die as will form the first flange. Then the partially-formed article is removed from the female die, and, if needful, is reheated. While in a heated state it is now pressed consecutively into other suitably-shaped dies until the first flange and the body have assumed somewhat the form of a hat. Then a part or all of the "crown" is removed. The rest is reheated, and that portion constituting the body is surrounded with a compound die made in parts—that is, one so that the first-formed flange, previously referred to, bears against one side of said compound die, while a portion of the main body projects beyond the contrary side of said die. This projecting portion of the body is now subjected to the action of a counter-punch, which turns it over in an outward direction, (or, if preferred, this operation may be performed by hand,) after which, by a suitably-formed tool, this second flange is completed.

When a flanged annular device manufactured according to my invention is to be used as a cover or cap for an opening in the shell or other part of a boiler or other vessel, the metallic plate is pressed into shape with one flange, as above described with reference to the first-mentioned flange, but without removing any portion of the crown. After the pressing and stamping processes the edge or edges of the flange or flanges is or are trimmed either by hand or machinery.

Referring to the accompanying drawings, Figures 1 and 2 illustrate a metallic plate, $a$, that has undergone the first operation of being cut to form, ready for stamping.

Figs. 3 and 4 illustrate in plan and sectional elevation the second operation—viz., the first cupping process—$a$ being, as before, the metallic plate; $b$, the female die, and $c$ the punch or male die.

Figs. 5 and 6 illustrate the third operation, wherein the plate $a$, as shown, has been subjected to the second cupping process. The female die $b$, here shown, is the same as used in the second operation or first cupping process, but has been inverted for the present operation, (or in lieu thereof a special die may be provided.) $d$ is the punch or male die.

Figs. 7 and 8 illustrate the fourth operation—that is to say, the final cupping and first flanging process. $e$ is the female die, and $d$ the finishing-punch or male die as used in the previous operation, the flattening of the flange being effected by the head of the press or hammer (used in this operation) projecting beyond the punch or male die *d*.

Figure 9:
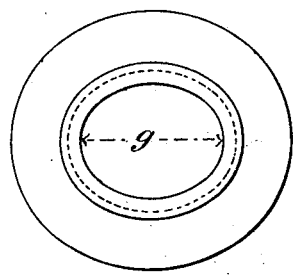
Figs. 9 and 10 illustrate in plan and sectional elevation the partially-formed object after it has undergone the fifth operation—that is, that of having the crown or part *g* removed, ready for the formation of a second flange. The removal of the part *g* may be effected either by hand, by punching, or by turning.
Figure 10:
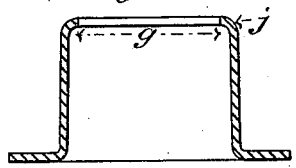
Figure 11:
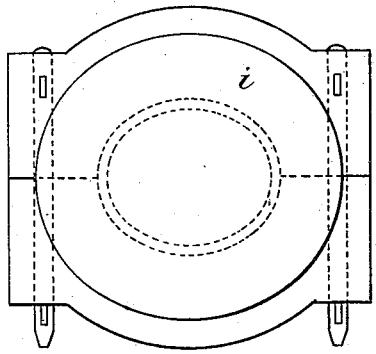
Figs. 11 and 12 illustrate the sixth operation, or the partial formation of the second flange. *h* is the compound female die, in halves or parts; *i*, the counter-punch for partially turning over the part *j*, Figs. 10 and 12.
Figure 12:
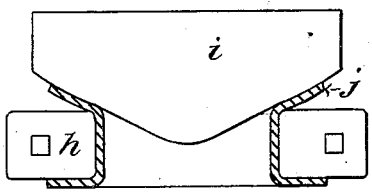
Figure 13:
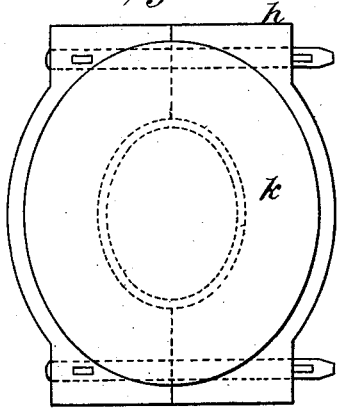
Figs. 13 and 14 illustrate in plan and elevation the seventh operation—that is, the completion of the second flange. This must have the same configuration crosswise as that of the boiler or object to which it has to be attached. *h* is the same compound female die as used in the sixth operation; *k*, the finishing flanging tool.
Figure 14:
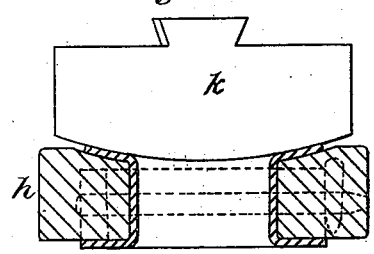
Figure 15:
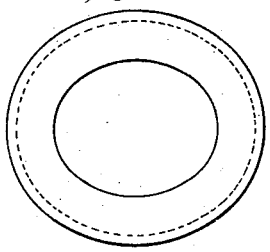
Figure 16:
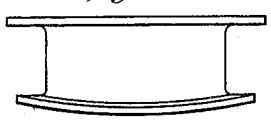
Figure 17:
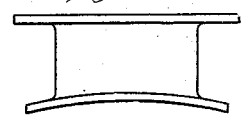

Figs. 15, 16, and 17 show in plan and elevations the finished man-hole after it has undergone the eighth operation—viz., that of having the edges of the flanges trimmed or turned to a regular form, ready for use.

Unions and other similar articles, previously referred to, are formed in a similar manner to the man-hole just described; but I would observe that the operations required to produce objects such as above referred to may in some cases be more or less in number than those above described.

What I claim is—

As an improvement in the art of making metallic man-holes for steam-boilers and like articles, drawing a disk to the form of a tube and turning a flange on the open end thereof in dies, cutting out the metal, closing the opposite end, and then forming a similar flange on said opposite end by means of dies, in the manner substantially as described.

JOSEPH TORDOFF.

Witnesses:
T. E. CRAVEN,
*Fell. Inst. P. Agents, 24 Victoria Chambers, Leeds.*
WILLIAM SADLER,
*North Street, Leeds.*